No. 733,376. PATENTED JULY 14, 1903.
B. DRAPER.
TUBE OR ROD CLAMP AND COUPLING.
APPLICATION FILED NOV. 10, 1900.
NO MODEL.
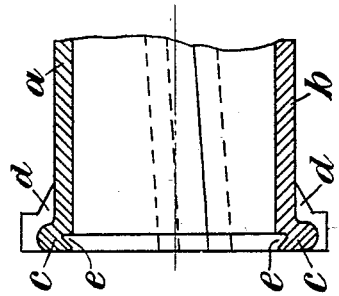
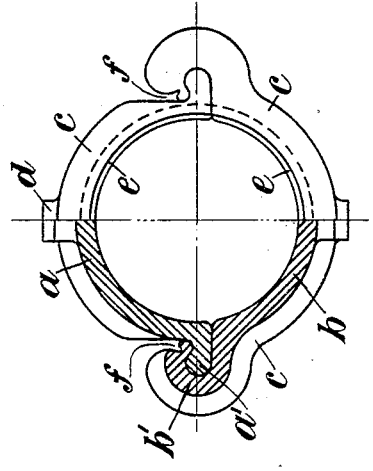
INVENTOR
Benjamin Draper
BY
Richardson
ATTORNEYS
WITNESSES:
Ella L. Giles
Clara D. Frohbach No. 733,376. Patented July 14, 1903.

UNITED STATES PATENT OFFICE.

BENJAMIN DRAPER, OF LIVERPOOL, ENGLAND.

TUBE OR ROD CLAMP AND COUPLING.

SPECIFICATION forming part of Letters Patent No. 733,376, dated July 14, 1903.

Application filed November 10, 1900. Serial No. 36,080. (No model.)

*To all whom it may concern:*

Be it known that I, BENJAMIN DRAPER, engineer, a subject of the Queen of England, and a resident of Everton, Liverpool, England, have invented certain new and useful Improvements in Tube or Rod Clamps and Couplings, of which the following is a specification.

This invention has reference to clamps or clamping appliances for use on the outside of tubes or pipes or tubular bodies or on the inside surfaces of same and also on the outside of rods or bars, with the object, purpose, and effect of covering over and closing defects, apertures, or the like in such tubes, pipes, or hollow bodies, or for strengthening same or coupling the ends of same together, or for coupling rods, shafts, or bars, and for any analogous or other purpose to which the appliances or improvements or any of them hereinafter described are serviceable.

The invention will be described with the aid of the accompanying drawings, in which—

Figures 1 and 2 illustrate improvements in connection with clamp-couplings wherein one part engages with another by a sliding joint of the kind referred to or an equivalent kind by which a liquid or steam tight joint is made between the edge of the clamp or coupling and the surface of the pipe or tube. The construction of the clamping or coupling appliances under this modification by which this is accomplished consists in providing a groove or recess $e$ in the ends of the parts $a$ and $b$, the recess at the inner part being deeper—*i. e.*, larger in diameter—than the outer part—namely, the opening in the face of the flanges $c$—and when the two parts $a$ and $b$ are together in place and driven up on the pipe $o$ into the relative positions shown the space within this groove $e$ is filled in with cement, lead, or other suitable material. When the cement, lead, or material is in place, any pressure from within or without will be unable to pass this packing, as the construction and ring form a key. To make the joint along the edges between the two parts $a$ and $b$ longitudinally, the edges of the folded-over flanges $b'$ are each provided with a recess at $f$, such recesses being so formed that when the two parts are in position the space between the lower part of the surface of the recess inside and the surface of the part $a$ is larger than at the upper part, and this recess being filled with lead or other material, similarly as just described with reference to the annular packing in $e$, a tight water or steam joint is provided longitudinally on either side. A slight groove may also be provided on the sides of the part $a$ in order that the packing will cover the joint below between the edges of the flanges $b'$ and the side of $a$, or in lieu of placing this packing in this position it—say a lead wire—may be placed in a longitudinal groove in the face of the flanges $b'$, on which the under faces of the flanges $a'$ press when driven up.

In the case of the use of the clamping appliances in connection with lead, iron, or other pipes for stopping up leaks or holes, especially when these are the result of bursts, if the pipe or tube be distorted the pressure acting detrimentally on the surface of the pipe, due to the forcing of one part of the appliance longitudinally upon the other, causes the metal to be squeezed together and pressed back to its natural position, so that in many cases no insertion over the crack or hole will be required between the pipe and the clamp-surface; but in any case such insertions of rubber, plastic jointing material, or the like may be introduced where desired.

The construction of the clamping appliances described and shown is one which enables the appliance to be made of comparatively thin metal, in consequence of which it is light and at the same time very strong.

What is claimed in respect of the herein-described invention is—

A hollow clamp comprising two parts $a$, $b$, having flanges $a'$, $b'$ respectively, adapted to engage with each other and disposed at an inclination to the axis of the clamp, internal circumferential dovetail-shaped grooves $e$, at the ends of said parts, and longitudinal dovetail-shaped grooves $f$ between the inner side of the overturned edges of the flanges of one of said parts and the outside surfaces of the body of the other part, substantially as set forth.

In witness whereof I have hereunto set my hand in presence of two witnesses.

BENJAMIN DRAPER.

Witnesses:
 JNO. W. BROWN,
 FRANK E. FLEETWOOD.